United States Patent
Bradbury et al.

(10) Patent No.: US 9,940,102 B2
(45) Date of Patent: Apr. 10, 2018

(54) PARTIAL STOCHASTIC ROUNDING THAT INCLUDES STICKY AND GUARD BITS

(71) Applicant: International Business Machines Corporation, Armonk, NY (US)

(72) Inventors: Jonathan D. Bradbury, Poughkeepsie, NY (US); Steven R. Carlough, Poughkeepsie, NY (US); Brian R. Prasky, Campbell Hall, NY (US); Eric M. Schwarz, Gardiner, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

(21) Appl. No.: 14/987,034

(22) Filed: Jan. 4, 2016

(65) Prior Publication Data

US 2017/0192752 A1 Jul. 6, 2017

(51) Int. Cl.
*G06N 99/00* (2010.01)
*G06F 7/499* (2006.01)
*G06F 7/58* (2006.01)
*G06N 3/04* (2006.01)

(52) U.S. Cl.
CPC .............. *G06F 7/588* (2013.01); *G06F 7/499* (2013.01); *G06F 7/49947* (2013.01); *G06N 3/0472* (2013.01); *G06N 99/005* (2013.01)

(58) Field of Classification Search
CPC ................. G06F 7/499; G06F 7/49947–7/4998
USPC ................................................. 708/497, 551
See application file for complete search history.

(56) References Cited

U.S. PATENT DOCUMENTS

| | | | | |
|---|---|---|---|---|
| 6,128,726 A | * | 10/2000 | LeComec | G06F 7/5443 708/204 |
| 8,601,237 B2 | | 12/2013 | Archer et al. | |
| 2004/0078401 A1 | * | 4/2004 | Hilton | G06F 7/48 708/252 |
| 2005/0055185 A1 | | 3/2005 | Dhong et al. | |
| 2006/0047739 A1 | | 3/2006 | Schulte et al. | |
| 2006/0220932 A1 | * | 10/2006 | Okumichi | H04N 5/21 341/55 |
| 2015/0039546 A1 | | 2/2015 | Alvarez-Lcaza et al. | |
| 2017/0103321 A1 | * | 4/2017 | Henry | G06N 3/088 |

OTHER PUBLICATIONS

Max Maxfield; "An Introduction to Different Rounding Algorithms"; EE Times; Jan. 4, 2006; pp. 5.

(Continued)

*Primary Examiner* — Matthew Sandifer
(74) *Attorney, Agent, or Firm* — Cantor Colburn LLP; William A. Kinnaman, Jr.

(57) ABSTRACT

The disclosed herein related to a method for generating a partial stochastic rounding operation executed by a processor coupled to a memory. The method includes generating an intermediate result and causing a random number generator to generate a random number. The method also includes adding the random number to lower significant bits of the intermediate result to perturb any incrementing of most significant bits of the intermediate result to produce a resulting sum. The method also includes truncating the resulting sum into a final result. According to other embodiments, the above method can be implemented in a system or computer program product.

16 Claims, 6 Drawing Sheets

Process Flow 200

(56) References Cited

OTHER PUBLICATIONS

Rob Gravelle; Database Journal; "Rounding Down, Bankers Rounding, and Random Rounding in MySQL"; Dec. 2, 2013; pp. 4.
Software Patent Institute et al.; "Stochastic Catastrophe Theory in Computer Performance Modeling"; An IP.com Prior Art Database Technical Disclosure; http://ip.com/IPCOM/000148636; Mar. 30, 2007; pp. 67.
Software Patent Institute et al.; "Burst Processing"; An IP.com Prior Art Database Technical Disclosure; http://ip.com/IPCOM/000151440; Apr. 22, 2007; pp. 33.

\* cited by examiner

Process Flow 200

US 9,940,102 B2

PARTIAL STOCHASTIC ROUNDING THAT INCLUDES STICKY AND GUARD BITS

BACKGROUND

The disclosure relates generally to partial stochastic rounding that includes sticky and guard bits.

In general, machine learning and neural network applications require a method of rounding results using a random value to determine if a fractional part of an intermediate result should cause an increment (rounding up) or truncation (rounding down) of the final result. For instance, in a contemporary implementation, a method of rounding can determine a cost of a product to the nearest five cents to eliminate the use of pennies. Yet, when 10,000 products are sold at the cost of $9.98 cents, a seller will likely always receive the benefit of the rounding (e.g., $9.98 more often will round up to $10.00 than round down to $9.95). At present, the contemporary implementations of these applications fail to avoid a tendency for one side to always benefit when attempting to implement methods of rounding.

SUMMARY

According to one embodiment, a method for generating a partial stochastic rounding operation executed by a processor coupled to a memory is provided. The method includes generating an intermediate result and causing a random number generator to generate a random number. The method also includes adding the random number to lower significant bits of the intermediate result to perturb any incrementing of most significant bits of the intermediate result to produce a resulting sum. The method also includes truncating the resulting sum into a final result. According to other embodiments, the above method can be implemented in a system or computer program product.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In view of the above, embodiments of the present invention disclosed herein may include a system, method, and/or computer program product (herein the system) that provides stochastic rounding through adding a random number. That is, the system adds a pseudo random number to an intermediate result to perturb any incrementing of the least significant bit of result. The system can add a random number. The intermediate result can comprise guard bits followed by a sticky bit which is a function of all the remaining bits. The sticky bit can indicate the logical OR of all the remaining reduced bits which indicates whether these bits are nonzero. The intermediate result with its guard bits and sticky bit can be added to the random number digit and the result is truncated.

In general, the rounding operation is used on any operation which produces an intermediate result which has more precision than designated for the final result. Multiplication is one of these operations. The operands generally have the same number of bits. The intermediate result due to the multiplication includes a higher number of bits than the either of the individual operands and is within one bit of the sum of the operands' precisions. Since most instructions desire the system to continue utilizing a same format (e.g., the same number of bits as the original operands), the intermediate result is then rounded to generate a final result with the format of the operands. The stochastic rounding system rounds the intermediate result up or down based on a random number that preserves a full probability distribution of the rounded intermediate result. A full probability distribution links each outcome (e.g., the rounded intermediate result) of a stochastic rounding operation with a probability of occurrence (e.g., in accordance with rounding the intermediate result up or down based on a random number).

For instance, with respect to an N bit fixed point format and a multiplication operation, an N bit number times and N bit number will yield a 2 N bit product. The product needs to be rounded to N bits. To do this stochastically, a random number of N bits could be added to the least significant N bits and then the result truncated to the upper N bits. This requires a random number the same size as the number of bits reduced.

Figure 1:
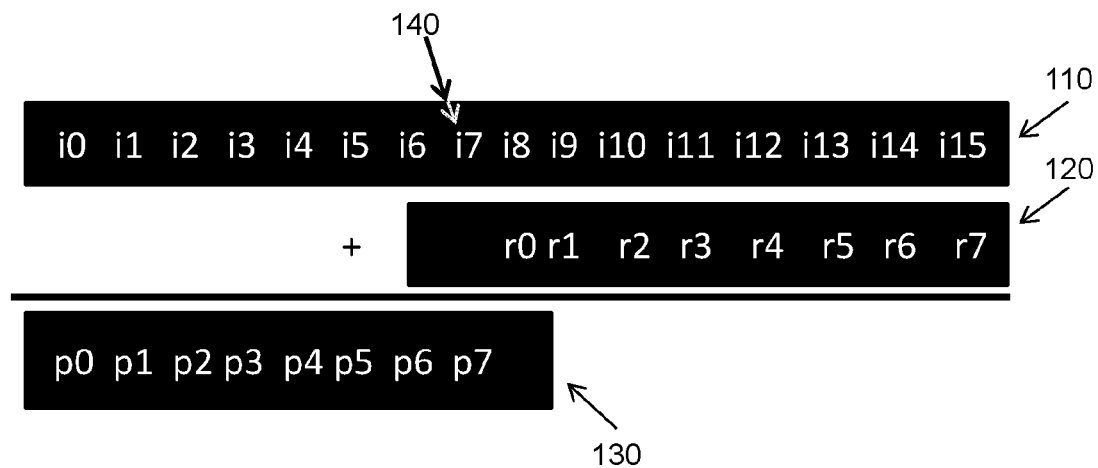
FIG. 1 illustrates an example of a stochastic rounding operation of the system in accordance with an embodiment.

Turning now to FIG. 1, an example of a stochastic rounding operation of the system is illustrated in accordance with an embodiment. In FIG. 1, the operands can be two 8-bit operands A and B. By multiplying these operands together, a 16-bit intermediate result 110 is produced (e.g., A*B=I, where A=a first 8 bit operand, B=a second 8 bit operand, and I=a 16-bit intermediate result). Each bit of the intermediate result 110 (i.e., intermediate result I) is labelled with a lower case i and a bit number from 0 to 15 where 0 is the most significant and 15 is the least significant. The intermediate result 110 is rounded based on a random number 120 to a 8-bit final result 130 (e.g., P=p0 p1 p2 p3 p4 p5 p6 p7=I rounded to a 8-bit final result based on R, where R is the random number 120). Particularly, a least significant bit i7 140 of the intermediate result 110, which is to be propagated to the 8-bit final result 130, is rounded up or down based on the random number 120 and the 8 bits of the intermediate result to be reduced labelled i8, i9, i10, i11, i12, i13, i14, and i15. Operationally, all of the bits to the right of the i7 bit of the intermediate result 110 are being added to all of the bits of the random number 120. If the result of this addition causes a one to carry over to the i7 bit of the intermediate result 110, then the least significant bit of the 8-bit upper bits of the intermediate result 110 (e.g., i0 to i7) is rounded up (e.g., incremented) to produce the final result 130. If the result of this addition causes a zero to carry over to the i7 bit of the intermediate result 110, then the least significant bit of the 8-bit upper bits of the intermediate result 100 (e.g., i0 to i7) is rounded down or truncated (e.g., not incremented) to produce the final result 130.

Figure 2:
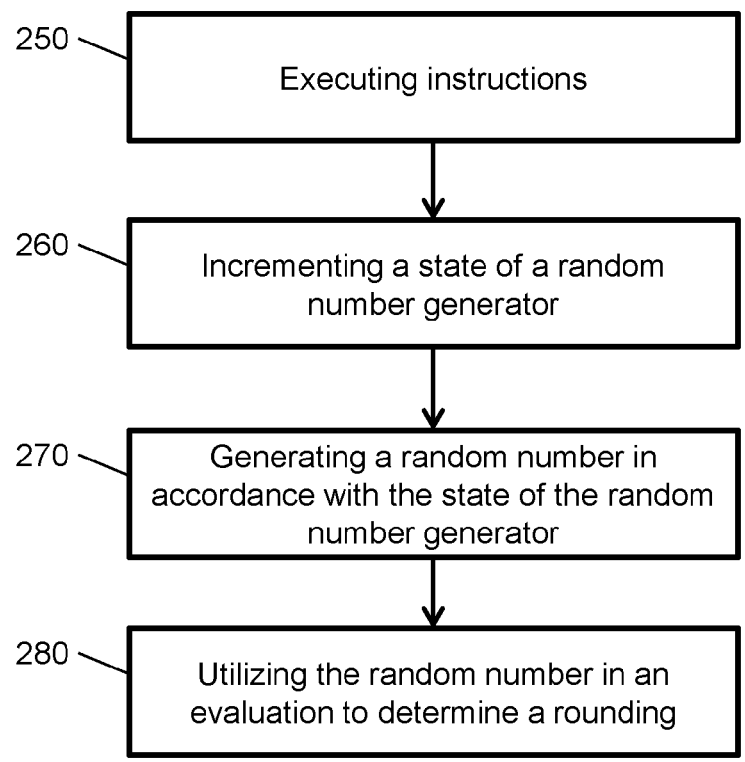
FIG. 2 illustrates a process flow for generating a random number within a stochastic rounding operation in accordance with an embodiment.

Turning now to FIG. 2, a process flow 200 is generally shown for generating a random number 120 within the stochastic rounding operation in accordance with an embodiment. The process flow 200 begins at block 250, where the system executes instructions. The instructions cause multiple pairs of operands to be multiplied, which generates a plurality of intermediate results. Each one of the plurality of intermediate results must be effectively rounded, while preserving a full probability distribution.

At block 260, the system increments a state of a random number generator. The state of the random number generator is a configuration that is used as an input to track output of the random number generator. The state of the random number generator can be started from an arbitrary initial state, such as by using a seed state. The random number generator increments the state in correspondence with each intermediate result At block 270, the system generates a random number in accordance with the state of the random number generator. Thus, a plurality of random number are generated, where each random number corresponds to one of the states of the random number generator and evidences the correspondence between each incremented state of the random number generator and the plurality of intermediate results.

At block 270, the system generates a random number in accordance with the state of the random number generator. Thus, a plurality of random numbers are generated, where each random number corresponds to one of the plurality of intermediate results based on the correspondence between each incremented state of the random number generator and the plurality of intermediate results. At block 280, the system utilizes each random number in an evaluation to determine a rounding. In this way, each of the plurality of intermediate results can be truncated while preserving a full probability. Note that upper bits of the intermediate product correspond to bits propagated into final result and the random number is added to reduce bits of the intermediate product. Also note that adding the random number to lower significant bits of the intermediate result perturbs any incrementing of most significant bits of the intermediate result, along with allows for truncating of a resulting sum into the final result.

In an embodiment, an M bit random number could be used when approximating the exact rounding, where M<N and could be added to the most significant bits to be removed. An example of this includes a vector unit where eight 16×16 bit multiplications are performed in parallel and only the upper 16 bit products are desired. Rather requiring 16×8 bits of random number, this could be reduced to 16×4 bits or 16×2 bits or 16×1 bit.

Figure 3:
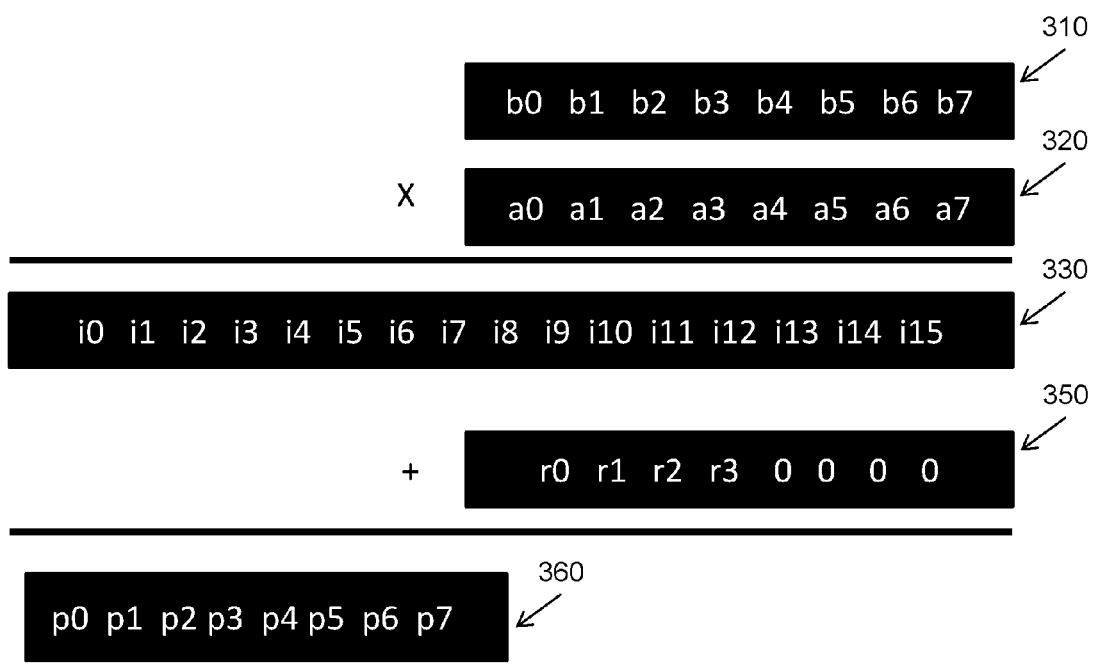
FIG. 3 illustrates an example of a partial stochastic rounding operation in accordance with an embodiment.

Turning now to FIG. 3, an example of a partial stochastic rounding operation is generally shown in accordance with an embodiment. The partial stochastic rounding operation multiplies a multiplicand 310 by a multiplier 320 to product an intermediate product 330. A partial random number 350 is then generated and added to the intermediate product 330 to determine a rounded product 360.

In an embodiment, guard bits followed by a sticky bit of all the remaining bits are used during a stochastic rounding operation by the system. The sticky bit indicates whether the logical OR of all the remaining reduced bits is zero. Then the intermediate result with its guard bits and sticky bit are added to the random number and the result is truncated. By using the sticky bit there would be some dependence on the exactness of other bits not previously involved in the rounding. Further, the random number bit that corresponds to the sticky bit can be chosen to be less likely a one to balance out the nature of the sticky bit to most likely be a one.

Figure 4:
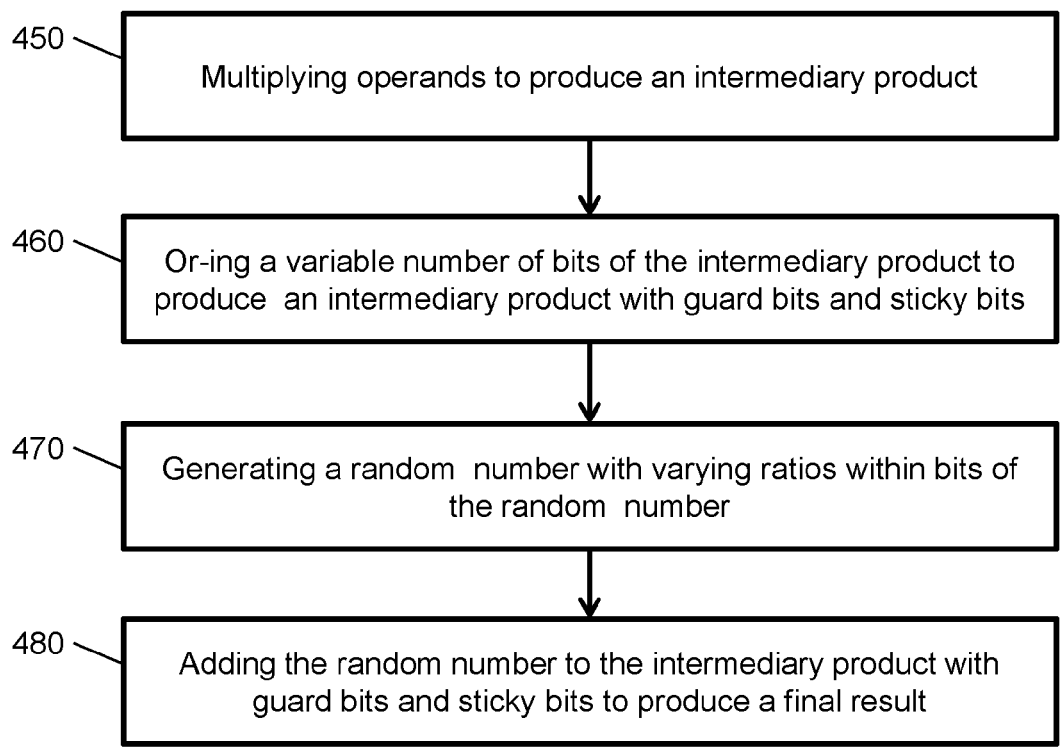
FIG. 4 illustrates a process flow for partial stochastic rounding in accordance with an embodiment.
Figure 5:
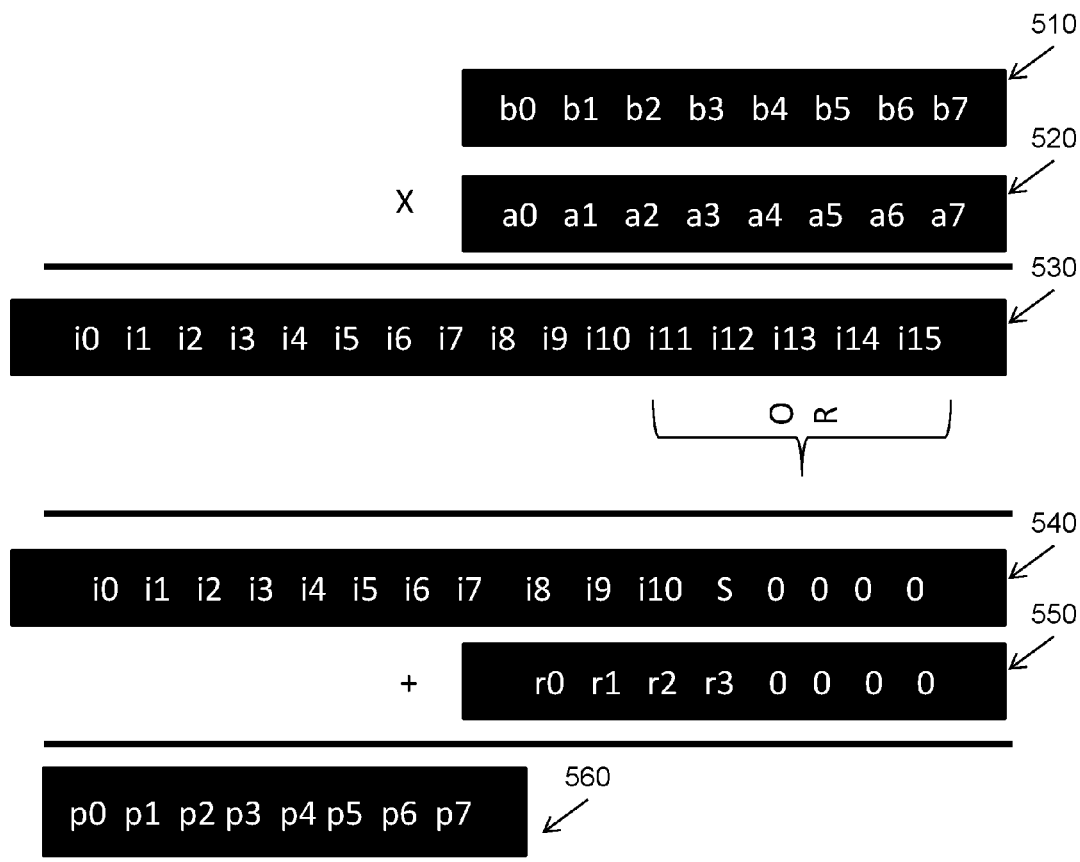
FIG. 5 illustrates an example of a partial stochastic rounding operation that includes sticky and guard bits in accordance with an embodiment.

Turning now to FIGS. 4-5, the partial stochastic rounding operation that includes sticky and guard bits will be described. FIG. 4 illustrates a process flow 400 for partial stochastic rounding in accordance with an embodiment. FIG. 5 generally shows an example of a partial stochastic rounding operation that includes sticky and guard bits in accordance with an embodiment.

The process flow 400 begins at block 450, where the system multiplies operands, such as a multiplicand 510 by a multiplier 520, to produce an intermediary product 530. At block 460, the system ORs a variable number of bits of the intermediary product 530 to produce an intermediary product with guard bits and sticky bits 540. At block 470, the system generates a random number 550 with varying ratios within bits of the random number 550. At block 480, the system adds the random number 550 to the intermediary product with guard bits and sticky bits 540 to produce a final result 560. For example, the system adds the random number to the intermediate result bits to be reduced to perturb any incrementing of the intermediate result bits to be propagated. In another embodiment, the system adds the random number to guard bits of the intermediate result to perturb any incrementing of the most significant bits of the intermediate result and truncates a resulting sum into the final result. In another embodiment, the system adds the random number to reduced set of guard bits and sticky bit of the intermediate result to perturb any incrementing of the most significant bits of the intermediate result and truncates a resulting sum into the final result.

Figure 6:
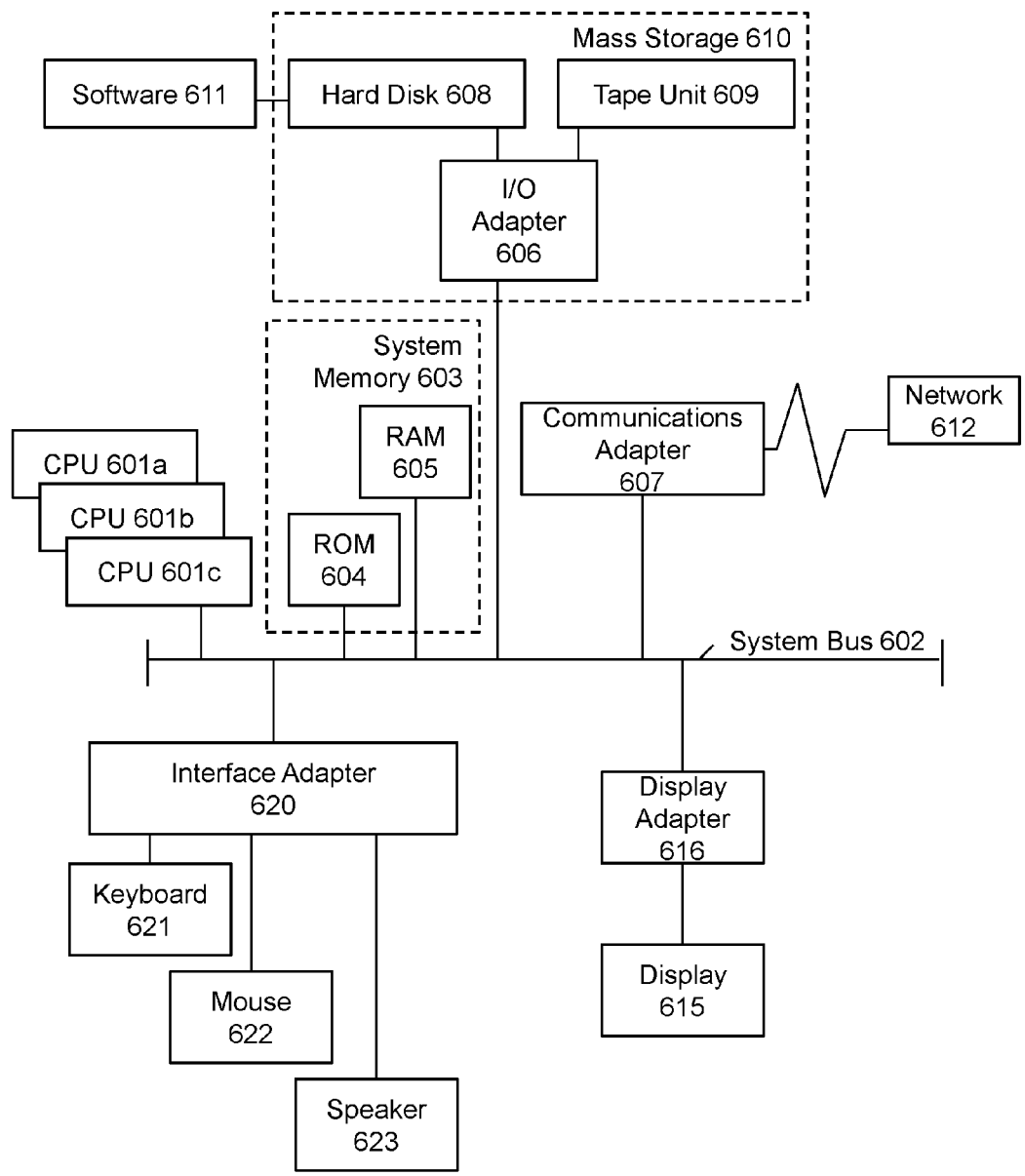
FIG. 6 illustrates a processing system in accordance with an embodiment.

Referring now to FIG. 6, there is shown an embodiment of a processing system 600 for implementing the teachings herein. In this embodiment, the processing system 600 has one or more central processing units (processors) 601a, 601b, 601c, etc. (collectively or generically referred to as processor(s) 601). The processors 601, also referred to as processing circuits, are coupled via a system bus 602 to system memory 603 and various other components. The system memory 603 can include read only memory (ROM) 604 and random access memory (RAM) 605. The ROM 604 is coupled to system bus 602 and may include a basic input/output system (BIOS), which controls certain basic functions of the processing system 600. RAM is read-write memory coupled to system bus 602 for use by processors 601.

FIG. 6 further depicts an input/output (I/O) adapter 606 and a network adapter 607 coupled to the system bus 602. I/O adapter 606 may be a small computer system interface (SCSI) adapter that communicates with a hard disk 608 and/or tape storage drive 609 or any other similar component. I/O adapter 606, hard disk 608, and tape storage drive 609 are collectively referred to herein as mass storage 610. Software 611 for execution on processing system 600 may be stored in mass storage 610. The mass storage 610 is an example of a tangible storage medium readable by the processors 601, where the software 611 is stored as instructions for execution by the processors 601 to perform a method, such as the above process flows. Network adapter 607 interconnects system bus 602 with an outside network 612 enabling processing system 600 to communicate with other such systems. A screen (e.g., a display monitor) 615 is connected to system bus 602 by display adapter 616, which may include a graphics controller to improve the performance of graphics intensive applications and a video controller. In one embodiment, adapters 606, 607, and 616 may be connected to one or more I/O buses that are connected to system bus 602 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 602 via an interface adapter 620 and the display adapter 616. A keyboard 621, mouse 622, and speaker 623 can be interconnected to system bus 602 via interface adapter 620, which may include, for example, a Super I/O chip integrating multiple device adapters into a single integrated circuit.

Thus, as configured in FIG. 6, processing system 605 includes processing capability in the form of processors 601, and, storage capability including system memory 603 and mass storage 610, input means such as keyboard 621 and mouse 622, and output capability including speaker 623 and display 615. In one embodiment, a portion of system memory 603 and mass storage 610 collectively store an operating system, such as the z/OS or AIX operating system from IBM Corporation, to coordinate the functions of the various components shown in FIG. 6.

Technical effects and benefits include managing hardware mechanisms to add a pseudo random number to an intermediate result to perturb any incrementing of the least significant bit of result. Thus, embodiments described herein are necessarily rooted in the system to perform proactive operations to overcome problems specifically arising in the realm of rounding results using a random value.

In view of the above, embodiments herein can be viewed from multiple perspectives. A first perspective can be a consumer level perspective (e.g., whether a seller of buying receives a benefit from rounding $9.98 to $10.00 or to $9.95). A second perspective can be a low level hardware perspective. For example, a system can include a vector execution unit (e.g., vector execution circuit, controller, firmware, and/or software) that has vector registers that are 128 bits wide. Instructions to the vector execution unit can specify operations on a full width of the vector registers and independently on different width elements. For instance, the vector register could be considered to be holding sixteen byte wide elements, eight halfword elements, or four word elements, where a byte is defined to contain 8 bits, a halfword contains 16 bits, and a word contains 32 bits. A vector byte multiply instruction can be defined to multiply corresponding byte elements of first and second vector registers and store the result in a third vector register. Each byte element multiplication has an 8 bit multiplier and an 8 bit multiplicand. This results in a 16 bit intermediate product. Yet, only an 8 bit result is desired. To round this 16 bit intermediate product stochastically to 8 bits would require 8 bits of random data. The full vector byte multiply instruction operates on 16 elements in parallel and would require 16 times 8 bits or a total of 128 bits of random data. This is the same width as the input operands and there is difficulty in generating this many random bits per cycle, and once generated, there is difficulty in routing the wires from the random number generator to the rounder, given the congestion of other busses in the system. The system reduces the requirements on random data to be less bits per element and overall less bits per vector instruction, while maintaining good statistical randomness and dependence on all the bits of intermediate product.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a partial stochastic rounding operation including managing hardware mechanisms to add a random number to an intermediate result executed by a processor coupled to a memory, the processor including wires routing outputs of a random number generator to inputs of a rounder, comprising:

generating the intermediate result from at least two operands;

causing the random number generator to generate the random number, the random number comprising M bits;

inputting the random number to the rounder;

causing the rounder to add the random number to M most significant bits of N lower significant bits of the intermediate result to perturb any incrementing of most significant bits of the intermediate result to produce a resulting sum, wherein M<N; and truncating the N lower significant bits from the resulting sum into a final result, wherein the intermediate result comprises guard bits followed by a sticky bit of all the remaining bits, wherein the intermediate result with the guard bits and the sticky bit are added to the random number and the final result is truncated.

2. The method of claim 1, further comprising:

executing an instruction that causes the at least two operands to generate the intermediate result; and incrementing a state of the random number generator to correspond to the random number.

3. The method of claim 1, wherein the sticky bit indicates whether a logical OR of all the remaining reduced bits is not equal to zero to indicate significance.

4. The method of claim 1, wherein N is a number of bits of one of the at least two operands that generate the intermediate result.

5. The method of claim 1, wherein the generating of the intermediate result comprises multiplying a multiplicand by a multiplier, the product of which is the intermediate result.

6. The method of claim 1, wherein the producing of the final result includes reducing the intermediate result by propagating upper bits of the bits of the intermediate result into the final result.

7. A computer program product, the computer program product comprising a computer readable storage medium having program instructions for generating a partial stochastic rounding operation including managing hardware mechanisms to add a random number to an intermediate result embodied therewith, the program instructions executable by a processor including wires routing outputs of a random number generator to inputs of a rounder, to cause the processor to perform:

generating the intermediate result from at least two operands;

causing the random number generator to generate the random number, the random number comprising M bits;

inputting the random number to the rounder;

causing the rounder to add the random number to M most significant bits of N lower significant bits of the intermediate result to perturb any incrementing of most significant bits of the intermediate result to produce a resulting sum, wherein M<N; and truncating the N lower significant bits from the resulting sum into a final result, wherein the intermediate result comprises guard bits followed by a sticky bit of all the remaining bits, wherein the intermediate result with the guard bits and the sticky bit are added to the random number and the final result is truncated.

8. The computer program product of claim 7, wherein the program instructions are further executable by the processor to cause:

executing an instruction that causes the at least two operands to generate the intermediate result; and incrementing a state of the random number generator to correspond to the random number.

9. The computer program product of claim 7, wherein the sticky bit indicates whether a logical OR of all the remaining reduced bits is not equal to zero to indicate significance.

10. The computer program product of claim 7, N is a number of bits of one of the-at least two operands that generate the intermediate result.

11. The computer program product of claim 7, wherein the generating of the intermediate result comprises multiplying a multiplicand by a multiplier, the product of which is the intermediate result.

12. The computer program product of claim 7, wherein the producing of the final result includes reducing the intermediate result by propagating upper bits of the bits of the intermediate result into the final result.

13. A system, comprising a processor and a memory storing program instructions for generating a partial stochastic rounding operation including managing hardware mechanisms to add a random number to an intermediate result thereon, the processor including wires routing outputs of a random number generator to inputs of a rounder, the program instructions executable by the processor to cause the system to perform:

generating the intermediate result from at least two operands;

causing the random number generator to generate the random number, the random number comprising M bits;

inputting the random number to the rounder;

causing the rounder to add the random number to M most significant bits of N lower significant bits of the intermediate result to perturb any incrementing of most significant bits of the intermediate result to produce a resulting sum, wherein M<N; and truncating the N lower significant bits from the resulting sum into a final result, wherein the intermediate result comprises guard bits followed by a sticky bit of all the remaining bits, wherein the intermediate result with the guard bits and the sticky bit are added to the random number and the final result is truncated.

14. The system of claim 13, wherein the program instructions are further executable by the processor to cause the system to perform:

executing an instruction that causes the at least two operands to generate the intermediate result; and incrementing a state of the random number generator to correspond to the random number.

15. The system of claim 13, wherein the intermediate result comprises guard bits followed by a sticky bit of all the remaining bits.

16. The system of claim 15, wherein the sticky bit indicates whether a logical OR of all the remaining reduced bits is not equal to zero to indicate significance.

\* \* \* \* \*